US010562129B2

(12) United States Patent
Kobayashi

(10) Patent No.: US 10,562,129 B2
(45) Date of Patent: Feb. 18, 2020

(54) METHOD FOR BONDING STEEL MATERIAL AND DEVICE FOR BONDING STEEL MATERIAL

(71) Applicant: HONDA MOTOR CO., LTD., Minato-ku, Tokyo (JP)

(72) Inventor: Takashi Kobayashi, Tochigi-ken (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/780,692

(22) PCT Filed: Nov. 25, 2016

(86) PCT No.: PCT/JP2016/084890
§ 371 (c)(1),
(2) Date: Jun. 1, 2018

(87) PCT Pub. No.: WO2017/094596
PCT Pub. Date: Jun. 8, 2017

(65) Prior Publication Data
US 2018/0354065 A1 Dec. 13, 2018

(30) Foreign Application Priority Data
Dec. 3, 2015 (JP) ................................ 2015-236674

(51) Int. Cl.
B23K 20/16 (2006.01)
B23K 20/02 (2006.01)
(Continued)

(52) U.S. Cl.
CPC .............. B23K 20/16 (2013.01); B23K 20/02 (2013.01); B23K 35/004 (2013.01); B23K 2103/04 (2018.08)

(58) Field of Classification Search
CPC ...... B23K 20/16; B23K 35/004; B23K 20/02; B23K 2103/04
(Continued)

(56) References Cited

U.S. PATENT DOCUMENTS 4,645,896 A * 2/1987 Baba .................... B23K 11/246
219/100
4,920,009 A * 4/1990 Lee ........................... B22F 7/04
252/62.51 R
5,225,025 A * 7/1993 Lambing ............. B29C 65/3416
156/358

FOREIGN PATENT DOCUMENTS

JP 62-045020 9/1987
JP 62-045020 B * 9/1987
(Continued)

OTHER PUBLICATIONS

International Search Report and Written Opinion for International Application No. PCT/JP2016/084890 dated Jan. 17, 2017, 12 pages.

Primary Examiner — Thien S Tran
(74) Attorney, Agent, or Firm — Amin, Turocy & Watson, LLP

(57) ABSTRACT

First steel material, a carbon sheet, and second steel material are put in a state of being separated from each other, and bonding parts are heated by, for example, applying current from a power supply to the carbon sheet. Alternatively, the bonding parts may be heated by an inductive heating coil. Thereafter, heating is terminated if the bonding parts reaching greater than or equal to the eutectic point and less than the liquidus line temperature is detected in the Fe—C phase diagram. Furthermore, the carbon sheet is made to be sandwiched between the first steel material and the second steel material.

7 Claims, 8 Drawing Sheets

(51) Int. Cl.
*B23K 35/00* (2006.01)
*B23K 103/04* (2006.01)

(58) Field of Classification Search
USPC .............................. 219/97, 603; 156/64, 358
See application file for complete search history.

(56) References Cited

FOREIGN PATENT DOCUMENTS

| | | |
|---|---|---|
| JP | 05-220583 | 8/1993 |
| JP | 06-007970 | 1/1994 |
| JP | 10-263847 | 10/1998 |

\* cited by examiner

METHOD FOR BONDING STEEL MATERIAL AND DEVICE FOR BONDING STEEL MATERIAL

TECHNICAL FIELD

The present invention relates to a technology using a carbon sheet for bonding steel members (material).

BACKGROUND ART

A diffusion bonding technology for bonding steel members has been known (see, e.g. Japanese Patent Publication No. 62-045020).

In Japanese Patent Publication No. 62-045020, steel members are bonded with an insert material sheet by heating the entire joint to a temperature of about 1200° C. or higher, and the insert material sheet is prepared by mixing a carbon powder with a binder containing an acrylic resin and a solvent and by forming the mixture into a sheet shape. When the carbon is diffused into a connection portion, the melting point of the steel material to be bonded is lowered. Therefore, the steel members can be bonded at a relatively low temperature.

The technology of Japanese Patent Publication No. 62-045020 is a brazing technology, whereby it takes about 5 hours to bond the steel members. In the brazing technology, a brazing material is sandwiched between the steel members, and the resultant is introduced into a brazing furnace, heated from an atmospheric temperature to a temperature of 1200° C. or higher, and maintained at a temperature of 1200° C. or higher. The acrylic resin is heated and evaporated in the heating process, while the carbon powder remains in the product.

During the process of heating from the atmospheric temperature (25° C.) to 1200° C., a part of the carbon powder is diffused into the steel material to be bonded while the acrylic resin is evaporated.

Therefore, when the temperatures of the steel members reach 1200° C. or higher, the amount of the carbon powder is often insufficient for the bonding. When the amount of the carbon powder is insufficient, the diffusion reaction proceeds insufficiently, and the steel members are not bonded sufficiently in part.

The supply amount of the insert material may be increased to compensate for the shortage of the carbon powder. However, this increase is costly and may result in excess of carbon. The excess of carbon leads to a defect such as embrittlement of the connection portion.

Thus, there has been a demand for developing a bonding technology capable of preventing carbon from being diffused during a heating process.

SUMMARY OF INVENTION

A principal object of the present invention is to provide a bonding technology capable of preventing carbon from being diffused during a heating process.

According to an aspect of the present invention, there is provided a method for bonding a first steel member and a second steel member with a carbon sheet utilizing isothermal solidification, comprising a heating process of, while keeping the carbon sheet out of contact with the first steel member and the second steel member, heating at least one of the first steel member and the second steel member using a heating mechanism in a vacuum atmosphere or an inert gas atmosphere, to heat a connection portion of the at least one of the first steel member and the second steel member to a temperature equal to or higher than an eutectic point and lower than a liquidus-line temperature in an Fe—C phase diagram, and a pressure bonding process of sandwiching the carbon sheet between the first steel member and the second steel member, and then pressing and bonding the connection portions of the first steel member and the second steel member using a pressing mechanism, to diffuse carbon from the carbon sheet into the connection portions.

In the present invention, the carbon sheet is not in contact with the steel members during the heating process. Therefore, the carbon is not diffused into the steel during the heating process, so that the steel members can be accurately bonded. Thus, the method of the invention is capable of preventing the carbon diffusion during the heating process.

In the heating process, it is preferred that the connection portions are arranged facing each other at a distance, and the carbon sheet is located between the connection portions but not in contact therewith.

In a case where the connection portions are arranged facing each other in this manner, the heating mechanism can be placed between the connection portions to improve the heating efficiency. In addition, since the carbon sheet is located between the connection portions arranged facing each other, the carbon sheet can be sandwiched between the connection portions only by moving one connection portion toward the other connection portion after the heating process to improve the workability.

The heating mechanism may be an induction heating coil or an electromagnetic wave generation mechanism, and the connection portion and its neighboring portion in a carbon steel member may be heated by the induction heating coil or an electromagnetic wave generated from the electromagnetic wave generation mechanism.

In a case where the induction heating coil or the electromagnetic wave is used to heat the connection portion and its neighboring portion in the carbon steel member in this manner, it is possible to heat only a desired portion. Therefore, the heating time can be shortened, and energy saving can be achieved.

The heating mechanism may be an electric power source for energizing the carbon sheet. In this case, the carbon sheet per se can be heated due to the energization by the electric power source, and the connection portion and its neighboring portion can be heated by heat from the carbon sheet.

In this case, the carbon sheet per se can be used as a resistance heating element, so that the structure of the heating mechanism can be simplified. In the case of using the induction heating coil between the connection portions, it is necessary to arrange the connection portions at a relatively large distance. In contrast, in the case of using only the thin carbon sheet between the connection portions, the connection portions can be arranged closer to each other, to improve the heating efficiency.

The heating time can be further shortened by using the induction heating coil or the electromagnetic wave in combination with the heating by the carbon sheet.

In the above method, it is preferred that the carbon sheet has an interspace, which a molten steel penetrates into. In this case, the contact area between the molten steel and the carbon is increased to accelerate the carbon diffusion.

According to another aspect of the present invention, there is provided an apparatus for bonding steel members, comprising a furnace shell lined or filled with a heat insulator, a support member attached to the furnace shell for supporting a first steel member, a pressing mechanism attached to the furnace shell for holding a second steel member, moving the second steel member toward the first steel member, and pressing the second steel member onto the first steel member, a sheet holding mechanism for holding a carbon sheet between the first steel member and the second steel member, at least one of an exhaust mechanism attached to the furnace shell for vacuumizing the inside of the furnace shell and an inert gas supply mechanism for supplying an inert gas to the furnace shell, a heating mechanism attached to the furnace shell for heating a connection portion of at least one of the first steel member and the second steel member to a temperature equal to or higher than an eutectic point and lower than a liquidus-line temperature in an Fe—C phase diagram, a temperature sensor attached to the furnace shell for detecting a temperature of at least one of connection portions of the first steel member and the second steel member heated by the heating mechanism, a pressure sensor attached to the furnace shell for detecting an inner pressure of the furnace shell, and a control unit for controlling the pressing mechanism, controlling the heating mechanism based on temperature information detected by the temperature sensor, and controlling at least one of the exhaust mechanism and the inert gas supply mechanism based on pressure information detected by the pressure sensor.

The apparatus is capable of suitably bonding the steel members while preventing the carbon diffusion during the heating process, though the structure of the apparatus is as simple as those of common hot press apparatuses, vacuum furnaces, brazing furnaces, and the like.

The heating mechanism may contain at least one component selected from the group consisting of an induction heating coil for heating the connection portion of the first steel member or the second steel member, an electromagnetic wave generation mechanism for heating the connection portion of the first steel member or the second steel member, and an electric power source for energizing the carbon sheet. All the induction heating coil, the electromagnetic wave generation mechanism, and the electric power source are common inexpensive devices. Therefore, the production cost of the steel member bonding apparatus can be reduced by using the components.

DESCRIPTION OF EMBODIMENT

An embodiment of the present invention will be described below with reference to the accompanying drawings. In the following description, the terms "bottom", "top", "left", and "right" correspond to the bottom, top, left, and right of the related drawing respectively.

Figure 1:
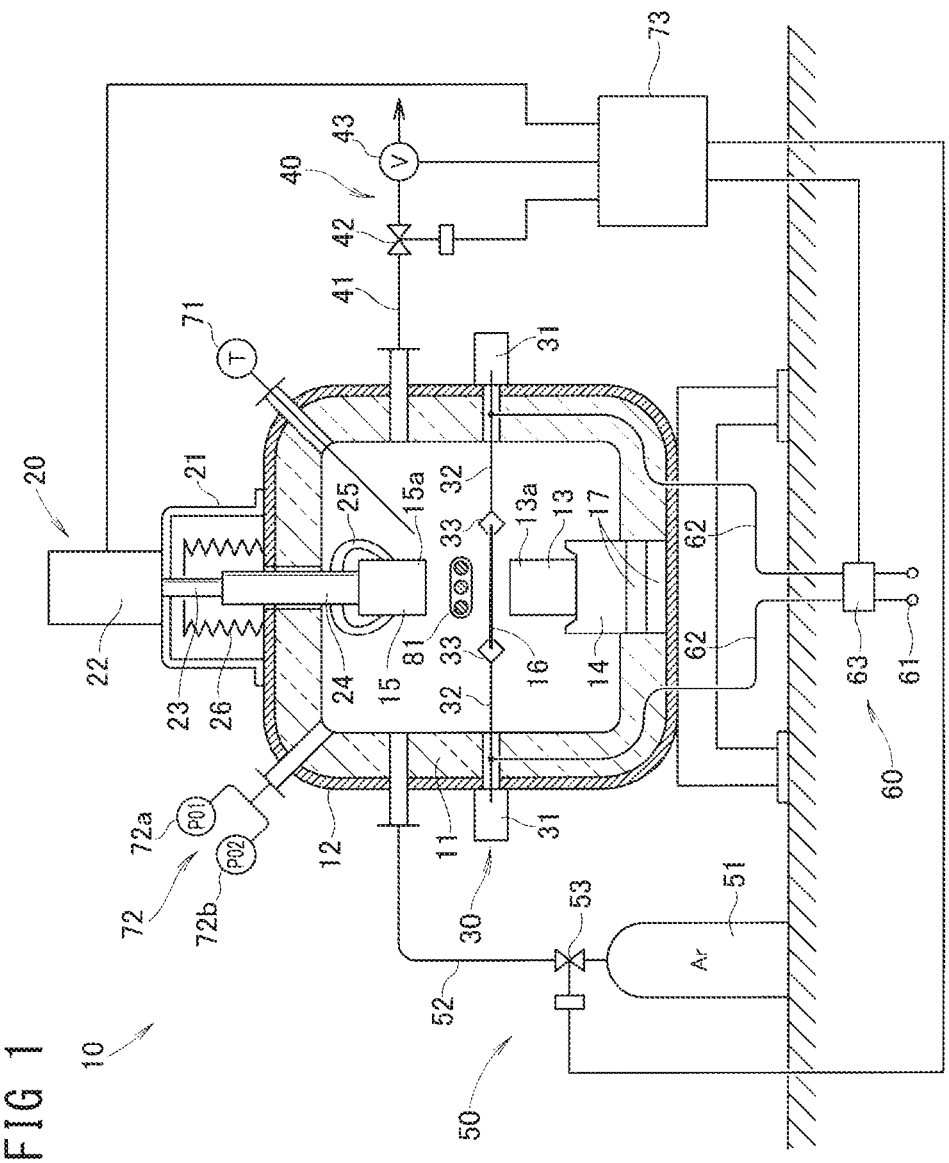
FIG. 1 is a front cross-sectional view of an apparatus for bonding steel members according to an embodiment of the present invention.

As shown in FIG. 1, an apparatus 10 for bonding steel members has a furnace shell 12 lined (or filled) with a heat insulator 11, a support member 14 attached to the furnace shell 12 for supporting a first steel member 13, a pressing mechanism 20 attached to the furnace shell 12 and arranged facing the support member 14 for holding a second steel member 15 and moving the second steel member 15 toward the first steel member 13 (downward in the drawings), a sheet holding mechanism 30 for holding a carbon sheet 16 between the first steel member 13 and the second steel member 15, an exhaust mechanism 40 attached to the furnace shell 12 for vacuumizing the inside of the furnace shell 12, an inert gas supply mechanism 50 attached to the furnace shell 12 for supplying an inert gas such as argon gas to the furnace shell 12, a heating mechanism 60 attached to the furnace shell 12 for heating at least one of the first steel member 13 and the second steel member 15 to a temperature equal to or higher than an eutectic point and lower than a liquidus-line temperature in an Fe—C phase diagram, a temperature sensor 71 attached to the furnace shell 12 for detecting temperatures of a connection portion 13a of the first steel member 13 and a connection portion 15a of the second steel member 15, a pressure sensor 72 attached to the furnace shell 12 for detecting the inner pressure of the furnace shell 12, and a control unit 73 for controlling the pressing mechanism 20, controlling the heating mechanism 60 based on temperature information detected by the temperature sensor 71, and controlling the exhaust mechanism 40 and the inert gas supply mechanism 50 based on pressure information detected by the pressure sensor 72.

The heat insulator 11 is preferably a board, a blanket, or a fabric of an aluminum oxide (alumina), silicon dioxide (silica), or the like. However, the blanket and the fabric may be shrunk under an external force. Therefore, it is preferred that heat insulating bricks 17, 17 are stacked on a bottom wall of the furnace shell 12, and the support member 14 is placed on the uppermost heat insulating brick 17.

Each of the first steel member 13 and the second steel member 15 is preferably composed of a carbon steel according to JIS G 0203, and may be composed of an alloy steel prepared by doping a carbon steel with a reinforcing element such as chromium or molybdenum. The connection portions 13a, 15a are the portions to be connected to the carbon sheet 16.

For example, the pressing mechanism 20 has a cylinder unit 22 supported by a support 21 on the furnace shell 12, a rod 24 supported by a piston rod 23 extending downward from the cylinder unit 22, tongs 25 formed on the rod 24 for holding the second steel member 15, and bellows 26 placed between the furnace shell 12 and the piston rod 23 for shutting off external air flow or preventing leakage of a gas from the furnace. Metal bellows prepared by connecting thin stainless steel plates are excellent in heat resistance, and therefore are preferably used as the bellows 26.

The pressing mechanism 20 acts to bring the second steel member 15 into tight contact with the first steel member 13 in such a manner that a molten steel generated in the first steel member 13 or the second steel member 15 is not extruded outside the connection portions 13*a*, 15*a*. Therefore, the cylinder unit 22 preferably contains an electric cylinder or an air cylinder having an axial force smaller than that of an oil hydraulic cylinder. Of course, the cylinder unit 22 may contain an oil hydraulic cylinder.

In a case where the second steel member 15 has a large size and a heavy weight, and the weight load of the second steel member 15 is completely applied to the first steel member 13, the molten steel may be extruded from the connection portions 13*a*, 15*a*. To prevent the extrusion, the cylinder unit 22, which can finely adjust the propulsive force, is adopted, and the force that acts on the first steel member 13 is controlled by adjusting the propulsive force depending on the weight of the second steel member 15.

For example, the sheet holding mechanism 30 has left and right cylinders 31, 31 for pulling the thin sheet at such a force that the sheet is not torn, and further has openable and closable claws 33, 33 disposed on the tip ends of piston rods 32, 32 of the cylinders 31, 31 for holding an edge of the carbon sheet 16. A spring may be used instead of the cylinders 31, 31. The piston rods 32, 32 and the openable and closable claws 33, 33 may be composed of a conductive metal.

For example, the exhaust mechanism 40 has an exhaust pipe 41 extending from the furnace shell 12, a vacuum valve 42 disposed on the exhaust pipe 41, and a vacuum pump 43 connected to the end of the exhaust pipe 41. An ejector may be used instead of the vacuum pump 43.

For example, the inert gas supply mechanism 50 has a gas container 51 containing an inert gas, a gas supply pipe 52 extending from the gas container 51 to the furnace shell 12, and a gas control valve 53 disposed on the gas supply pipe 52. The gas control valve 53 is controlled by the control unit 73 to adjust the flow rate or the pressure of the inert gas. The inert gas may be argon, nitrogen, or carbon dioxide gas.

At least one of the exhaust mechanism 40 and the inert gas supply mechanism 50 may be omitted. For example, the apparatus 10 may have the exhaust mechanism 40 without the inert gas supply mechanism 50. Conversely, the apparatus 10 may have the inert gas supply mechanism 50 without the exhaust mechanism 40.

The heating mechanism 60 has an electric power source 61, left and right harnesses 62, 62 extending from the electric power source 61 to the piston rods 32, 32 (or the openable and closable claws 33, 33) of the sheet holding mechanism 30, and an energization control portion 63 disposed in the middle of the harnesses 62, 62. The energization control portion 63 is controlled by the control unit 73 to adjust the electric energy to be supplied to the carbon sheet 16 and to switch the energization/non-energization state.

The temperature sensor 71 has a thermocouple having a protection tube, an infrared thermometer, an emission pyrometer, etc. The temperature sensor 71 acts to measure the temperatures of the connection portion 13*a* of the first steel member 13 and the connection portion 15*a* of the second steel member 15.

The pressure sensor 72 has a vacuum meter 72*a* for measuring a pressure lower than atmospheric pressure and a pressure meter 72*b* for measuring a pressure equal to or higher than atmospheric pressure. When the apparatus 10 does not have the inert gas supply mechanism 50, the pressure meter 72*b* is not required.

Figure 2:
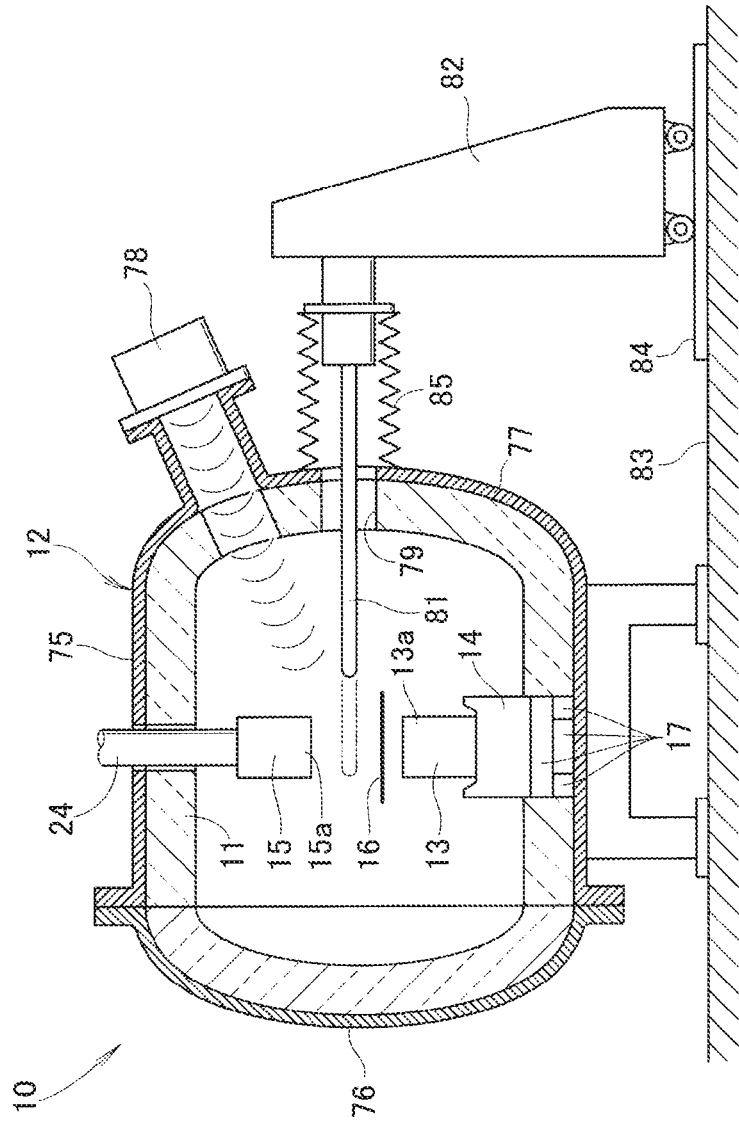
FIG. 2 is a longitudinal cross-sectional view of the bonding apparatus of FIG. 1.

For example, as shown in FIG. 2, the furnace shell 12 is a pressure tight container having a metal body 75, an openable and closable door 76 for covering one opening of the body 75, and a barrelhead 77 for covering the other opening the body 75. Thus, when the inner pressure of the furnace shell 12 is a vacuum pressure, the furnace shell 12 is not crushed under the atmospheric pressure. Furthermore, when the inner pressure of the furnace shell 12 is equal to or higher than the atmospheric pressure, the furnace shell 12 is not broken.

It is preferred that an electromagnetic wave generation mechanism 78 is attached to the barrelhead 77 as one heating mechanism 60. An induction heating coil 81 may be introduced through a through hole 79 formed in the barrelhead 77 from the outside into the inside of the furnace as another heating mechanism 60. The induction heating coil 81 is supported by a cradle 82 placed outside the furnace, and the cradle 82 is moved on a rail 84 formed on a floor 83. Bellows 85 extend from the cradle 82 to the barrelhead 77 to prevent intrusion of external air and leakage of a gas from the furnace.

The heating mechanism 60 contains as a main component a heating element capable of intensively heating the connection portions 13*a*, 15*a* of the first steel member 13 and the second steel member 15. The heating mechanism 60 may contain one or more or all of the heating elements of the electromagnetic wave generation mechanism 78, the induction heating coil 81, and the electric power source 61 for the carbon sheet 16 shown in FIG. 1.

Figure 3A:
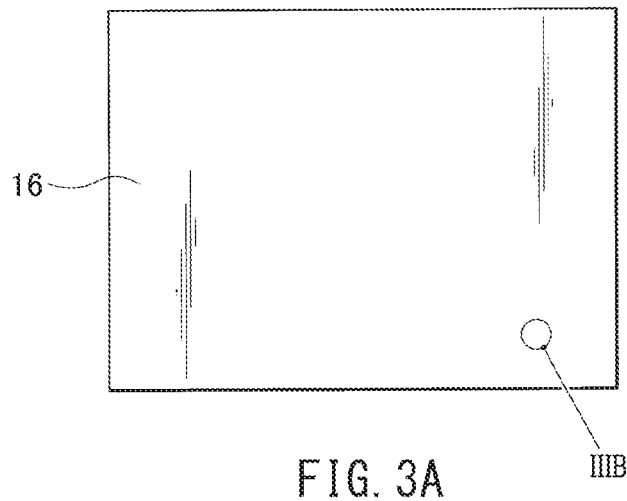
FIGS. 3A and 3B are views for illustrating a structure of a carbon sheet.
Figure 3B:
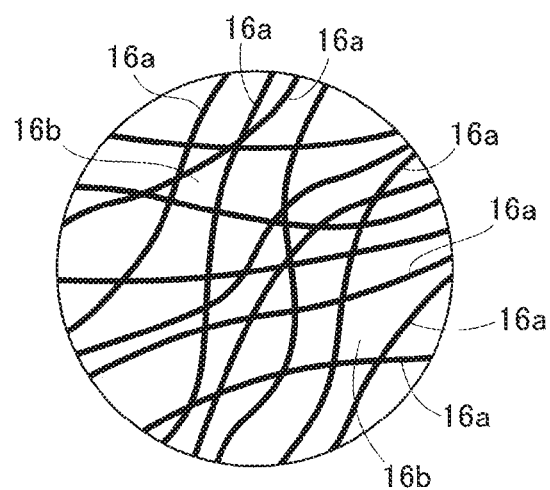

FIG. 3B is an enlarged view of the carbon sheet 16 at the portion indicated by IIIB in FIG. 3A.

As shown in FIG. 3B, the carbon sheet 16 is an aggregate of carbon fiber pieces 16*a* having a fine diameter. An interspace 16*b* is inevitably formed between adjacent carbon fiber pieces 16*a*, 16*a*. The carbon fiber pieces 16*a*, 16*a* are sparsely shown to facilitate understanding in this drawing. Actually, the carbon fiber pieces 16*a* densely overlap with each other, and numerous fine interspaces 16*b* are formed between the carbon fiber pieces 16*a*.

A steel member bonding method using the steel member bonding apparatus 10 having the above structure will be described below with reference to FIGS. 4 to 6.

In ST01 (ST means a step in the following description) of FIG. 4, the door 76 is opened. Then, the first steel member 13, the carbon sheet 16, and the second steel member 15 are placed in the furnace shell 12 (ST02). In this step, the first steel member 13, the carbon sheet 16, and the second steel member 15 are arranged at a distance from each other (see FIG. 1).

The door 76 is closed (ST03), and the vacuum pump 43 is operated to start vacuuming (ST04). When the pressure sensor 72 detects that the inner pressure reaches a predetermined vacuum degree (ST05), the control unit 73 acts to control the gas control valve 53 to supply the inert gas into the furnace shell 12 (ST06). Furthermore, the control unit 73 acts to control the energization control portion 63 to start heating (ST07).

The vacuuming may be stopped during the step of supplying the inert gas. The cost of operating the vacuum pump 43 can be reduced by the stop.

In a case where the inert gas is not supplied, ST07 is carried out after ST05. In this case, the vacuum pump 43 is continuously operated during the heating.

In a case where the vacuuming is performed, the operator can appropriately select whether or not the inert gas is supplied in the above manner. Furthermore, as described hereinafter, the operator can appropriately select whether or not the vacuuming is performed before the inert gas supply.

Figures 5B, 5C, 5D:
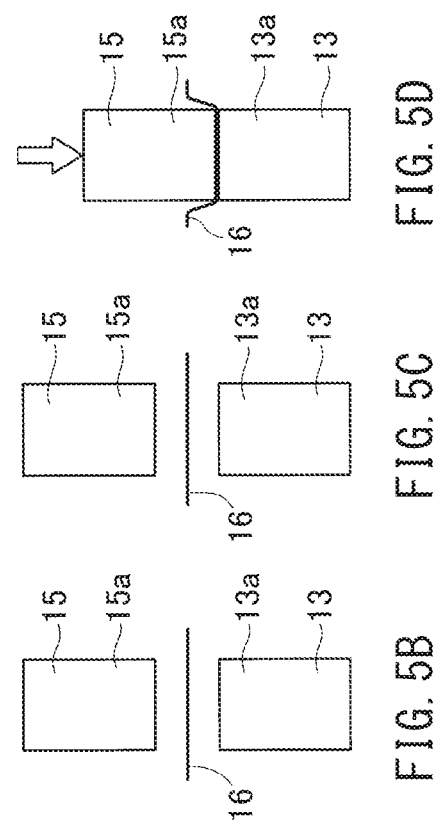
FIGS. 5B to 5D are layout drawings for illustrating arrangements of the steel members and the carbon sheet before a heating process, at the completion of the heating process, and in a diffusion bonding process, respectively.
Figure 5A:
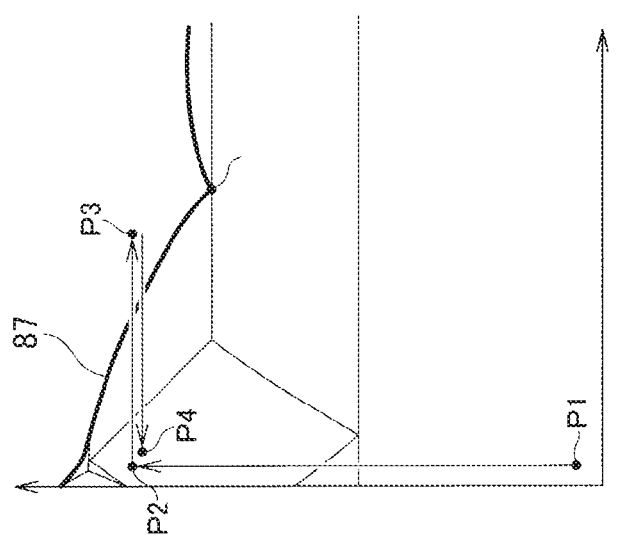
FIG. 5A is an Fe—C phase diagram.

FIG. 5A is an Fe—C phase diagram, FIG. 5B is a layout drawing at the start of the heating, FIG. 5C is a layout drawing at the completion of the heating, and FIG. 5D is a layout drawing in the diffusion bonding process.

As shown in FIG. 5A, in a region with a lower carbon content than that of a composition having the eutectic point, the liquidus line 87 represents a temperature at which the liquid phase is transformed to the solid phase and is sloped downward with the increase of the carbon content.

The connection portions 13a, 15a of the first steel member 13 and the second steel member 15 have the atmospheric temperature (about 25° C.) at the start of the heating. For example, in FIG. 5A, point P1 is shown as the atmospheric temperature. After the heating is started, the temperatures of the connection portions 13a, 15a of the first steel member 13 and the second steel member 15 are raised. The temperatures of the connection portions 13a, 15a are measured by the temperature sensor 71, and the connection portions 13a, 15a are heated to a temperature equal to or higher than the eutectic point and lower than the liquidus-line temperature. Thus, the compositions and temperatures of the connection portions 13a, 15a shown in FIGS. 5B and 5C are represented by point P2 in FIG. 5A.

Then, the cylinder unit 22 in the pressing mechanism 20 is operated, and the second steel member 15 is moved downward together with the rod 24 and the tongs 25. As a result, as shown in FIG. 5D, the carbon sheet 16 is pressed and moved downward by the second steel member 15. Thus, a pressure is applied from the second steel member 15 through the carbon sheet 16 to the first steel member 13. In other words, the second steel member 15 is pressed onto the first steel member 13. In this step, the inner structure of the carbon sheet 16 is in the state shown in FIG. 6A.

Figure 6A:
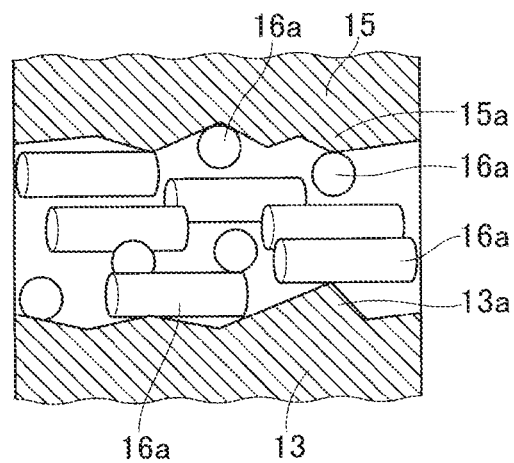
FIGS. 6A to 6C are schematic views for illustrating a molten steel penetrating into the carbon sheet.

As shown in FIG. 6A, the carbon fiber pieces 16a are partially brought into contact with the connection portions 13a, 15a. The carbon is diffused from the contact points into the connection portions 13a, 15a. Due to the diffusion, the carbon contents of the connection portions 13a, 15a are increased at the constant temperatures.

Thus, the compositions of the connection portions 13a, 15a are transferred from point P2 to P3 in FIG. 5A with the increase of the carbon contents. Point P2 is in the solid phase region, while point P3 is in the liquid phase region above the liquidus line 87. Therefore, melting of the connection portions 13a, 15a is started.

The carbon contents of the connection portions 13a, 15a are increased due to the carbon diffusion in this manner, so that the melting points of the connection portions 13a, 15a are lowered. Therefore, it is not necessary to heat the connection portions 13a, 15a to a temperature equal to or higher than the melting points (the liquidus-line temperatures) of the compositions measured before the carbon diffusion.

Figure 6B:
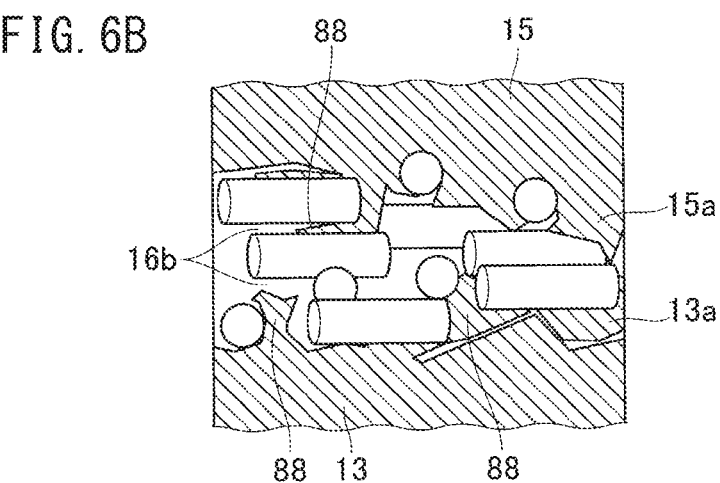

After the connection portions 13a, 15a are melted, as shown in FIG. 6B, the molten steel 88 penetrates into the interspaces 16b. As a result, the contact area between the carbon fiber pieces 16a and the connection portions 13a, 15a is drastically increased, and the diffusion is accelerated.

Figure 6C:
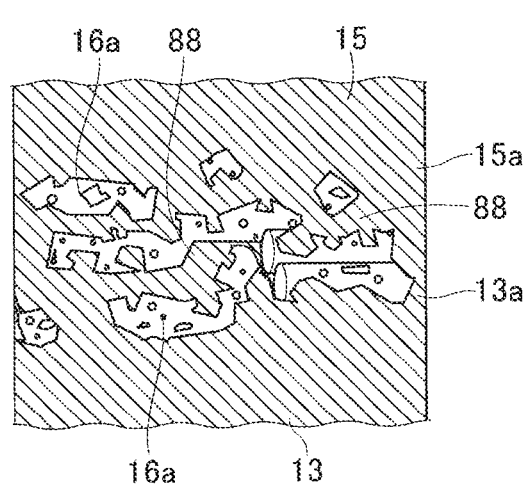

As shown in FIG. 6C, when the penetration further proceeds, the carbon fiber pieces 16a are completely covered with the molten steel 88. At this stage, the carbon diffusion distance is increased in the first steel member 13 and the second steel member 15, whereby the carbon contents of the connection portions 13a, 15a are reduced.

The compositions of the connection portions 13a, 15a are transferred from point P3 to P4 in FIG. 5A with the decrease of the carbon contents. Point P4 is in the solid phase region below the liquidus line 87. Therefore, the molten steel 88 and thus the connection portions 13a, 15a are solidified. Consequently, so-called isothermal solidification is caused.

Figure 4:
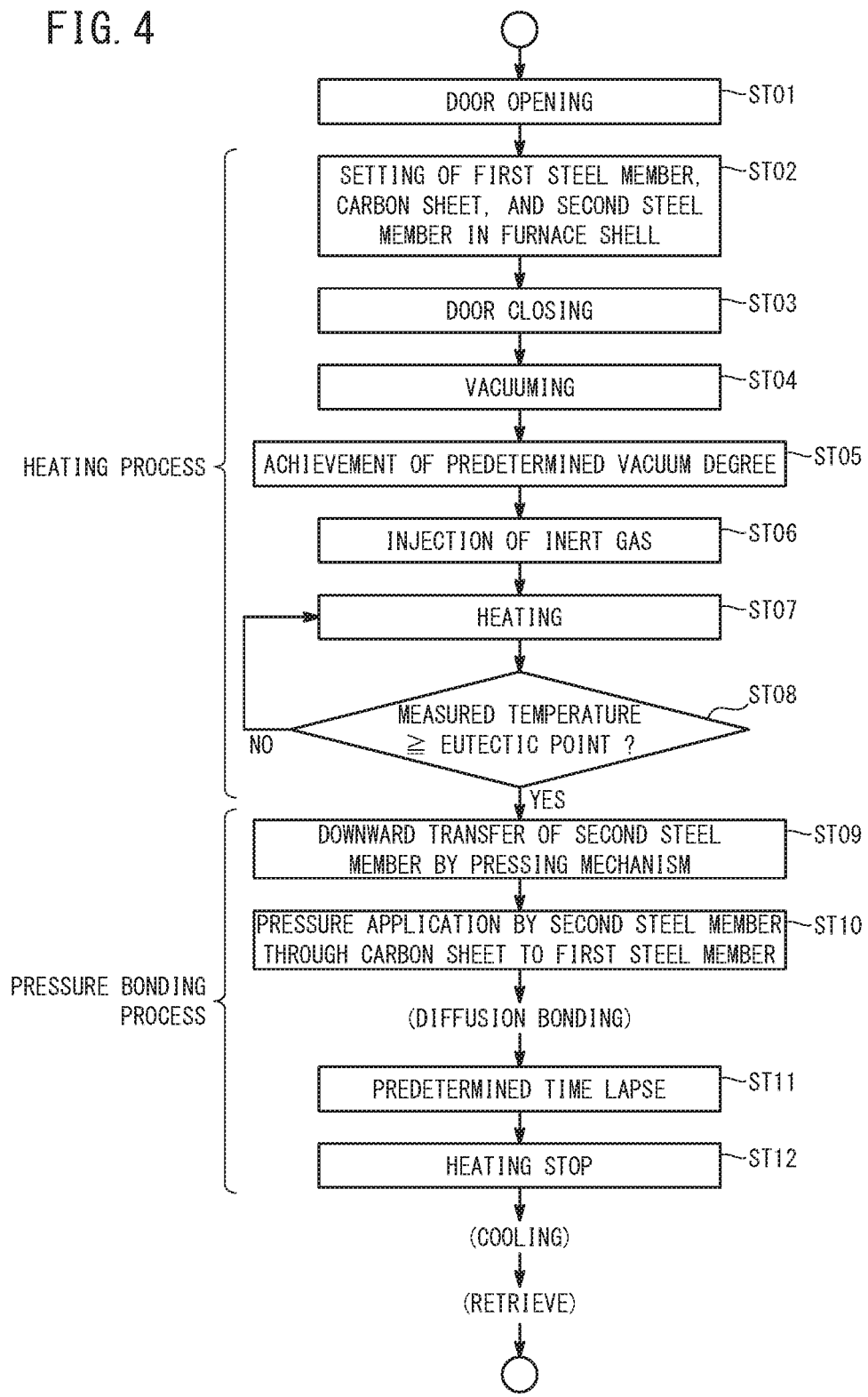
FIG. 4 is a flow diagram for illustrating a method for bonding the steel members according to the embodiment of the present invention.

The above description with reference to FIGS. 5A to 5D and 6A to 6C corresponds to ST08 to ST11 of FIG. 4.

In ST08 of FIG. 4, when the temperatures of the connection portions 13a, 15a reach a temperature equal to or higher than the eutectic point and lower than the liquidus-line temperature in the Fe—C phase diagram, the second steel member 15 is moved downward by the pressing mechanism 20 (ST09) and is pressed moderately onto the first steel member 13 with the carbon sheet 16 interposed therebetween (ST10). Then, the bonding illustrated by FIG. 6A to FIG. 6C is promoted.

After a predetermined time elapses (ST11), the heating is stopped (ST12), and the bonded article is retrieved after being cooled.

The bonding method of the present invention contains the heating process containing ST02 to ST08 and the pressure bonding process containing ST09 to ST12.

In the heating process, since the carbon sheet 16 is placed at a distance from each of the first steel member 13 and the second steel member 15, the carbon is not diffused from the carbon sheet 16 (the carbon fiber pieces 16a) into the connection portions 13a, 15a.

In the pressure bonding process, the second steel member 15 is brought into tight contact with the first steel member 13 in such a manner that the molten steel 88 is not extruded outside the connection portions 13a, 15a. Therefore, the shapes of the connection portions 13a, 15a are not changed or are changed only slightly. Consequently, the resultant bonded article has an excellent appearance.

Various types of the heating mechanisms 60 will be described below with reference to FIGS. 7A to 7E.

Figure 7A:
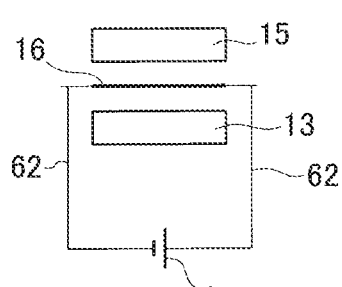
FIGS. 7A to 7C are schematic cross-sectional views of main portions for illustrating various heating mechanisms.

As shown in FIG. 7A, at least one of the connection portions 13a, 15a may be heated only by radiation heat from the carbon sheet 16 energized by the electric power source 61. This method is particularly effective when the first steel member 13 and the second steel member 15 have small sizes.

Figure 7B:
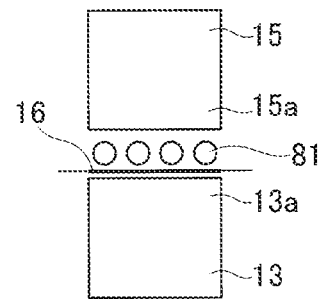

Alternatively, as shown in FIG. 7B, the carbon sheet 16 and the connection portions 13a, 15a of the first steel member 13 and the second steel member 15 may be heated only by the induction heating coil 81. This method is effective when the first steel member 13 and the second steel member 15 have large sizes.

Figure 7C:
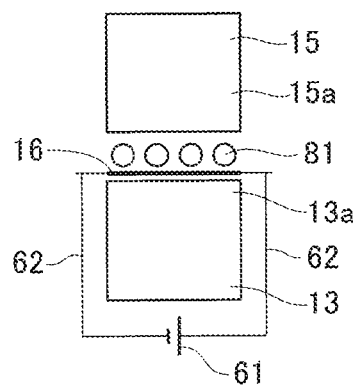

Alternatively, as shown in FIG. 7C, the connection portions 13a, 15a of the first steel member 13 and the second steel member 15 may be heated by the combination of the induction heating coil 81 and the carbon sheet 16. This method is capable of shorten the heating time.

Figure 7D:
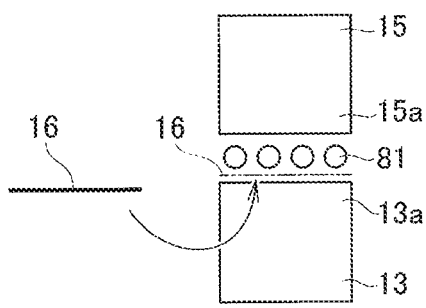
FIGS. 7D and 7E are schematic cross-sectional views of main portions for illustrating heating mechanisms at different positions.

Alternatively, as shown in FIG. 7D, the connection portions 13a, 15a of the first steel member 13 and the second steel member 15 may be heated by the induction heating coil 81 while the carbon sheet 16 is not placed between the first steel member 13 and the second steel member 15. After the heating, the induction heating coil 81 is removed, and the carbon sheet 16 having a normal temperature is placed between the connection portions 13a, 15a.

It is to be understood that the electromagnetic wave generation mechanism 78 may be used instead of the induction heating coil 81 in these example methods.

Figure 7E:
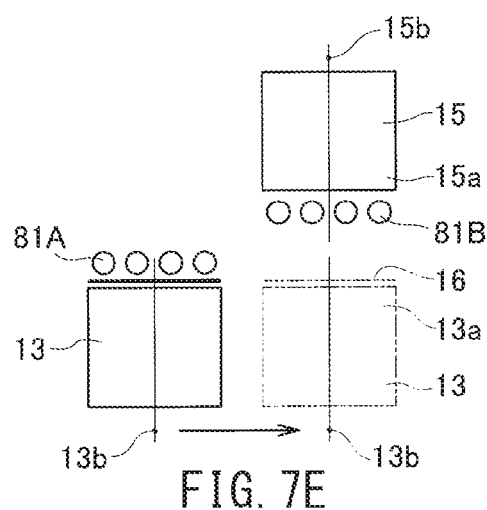

Alternatively, as shown in FIG. 7E, an axis 13b of the first steel member 13 may be arranged at an offset distance from an axis 15b of the second steel member 15. After the heating, the first steel member 13 or the second steel member 15 may be moved in such a manner that the axis 13b of the first steel member 13 and the axis 15b of the second steel member 15 are arranged facing each other.

Incidentally, from the viewpoint of the next pressure bonding process, it is preferred that the connection portion 13a and the connection portion 15a are arranged facing each other as shown in FIGS. 7A to 7D. In this case, the second steel member 15 can be moved toward the first steel member 13 readily after the heating.

The steel member bonding apparatus 10 shown in FIGS. 1 and 2 is a preferred example. The structure of the apparatus 10 may be modified as long as the method of the present invention can be carried out. Apparatuses according to modification examples shown in FIGS. 8A and 8B can be used in the present invention.

The modification examples will be described below.

Figure 8A:
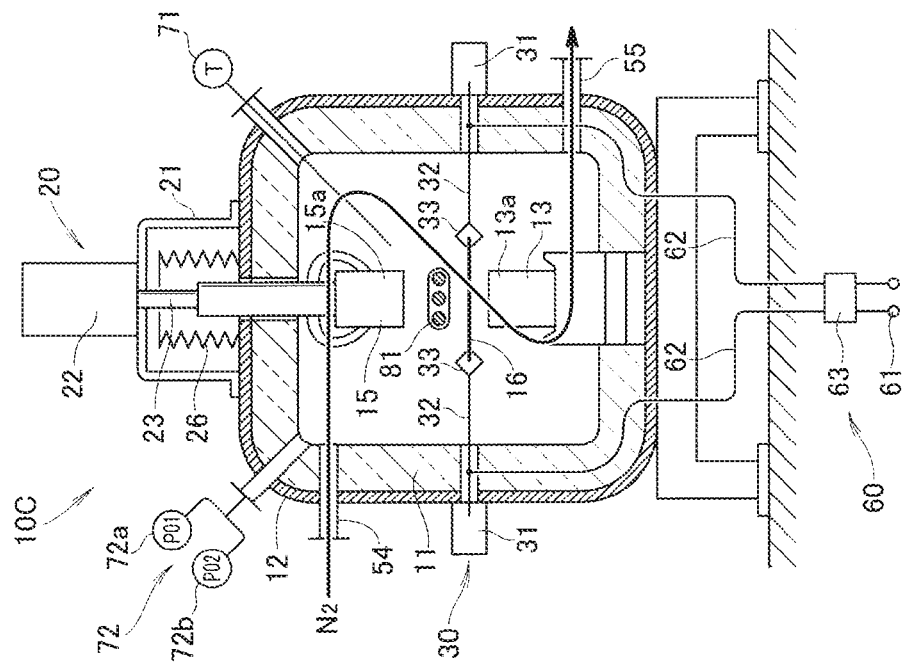
FIGS. 8A and 8B are front cross-sectional views of apparatuses for bonding steel members according to modification examples of the present invention.

In a case where the inert gas is a gas heavier than air such as the argon gas (Ar), in a steel member bonding apparatus 10B shown in FIG. 8A, a gas inlet 54 and a gas outlet 55 are arranged facing each other on an upper portion of the furnace shell 12. The apparatus 10B does not have the exhaust mechanism 40 shown in FIG. 1. The components of FIG. 8A, equal to those of FIG. 1, are denoted by the same reference numerals, and detailed explanations thereof are omitted.

In this example, after ST03 shown in FIG. 4, the inside of the furnace shell 12 is under an ambient (air) atmosphere.

Then, the inert gas heavier than air is supplied through the gas inlet 54 shown in FIG. 8A to the furnace shell 12. The inert gas is introduced to the bottom of the furnace shell 12, and acts to push up the air. As a result, the air is discharged through the gas outlet 55. When the inert gas is discharged through the gas outlet 55, the inside of the furnace shell 12 is considered to be replaced by the inert gas atmosphere. At this time, the heating is started.

Thus, in the case of using the steel member bonding apparatus 10B, ST04 of FIG. 4 is not needed, and ST06 is carried out after ST03. Since the exhaust mechanism 40 is not required, the steel member bonding apparatus 10B can have a simple structure and can be obtained at low cost.

A temperature sensor 71B is an emission pyrometer for directly measuring the temperature of the connection portion 13a of the first steel member 13. A temperature sensor 71C is an emission pyrometer for directly measuring the temperature of the connection portion 15a of the second steel member 15. The temperature sensors 71B, 71C may be thermocouples, and the ends of the thermocouples may be brought into contact with the connection portions 13a, 15a.

Figure 8B:
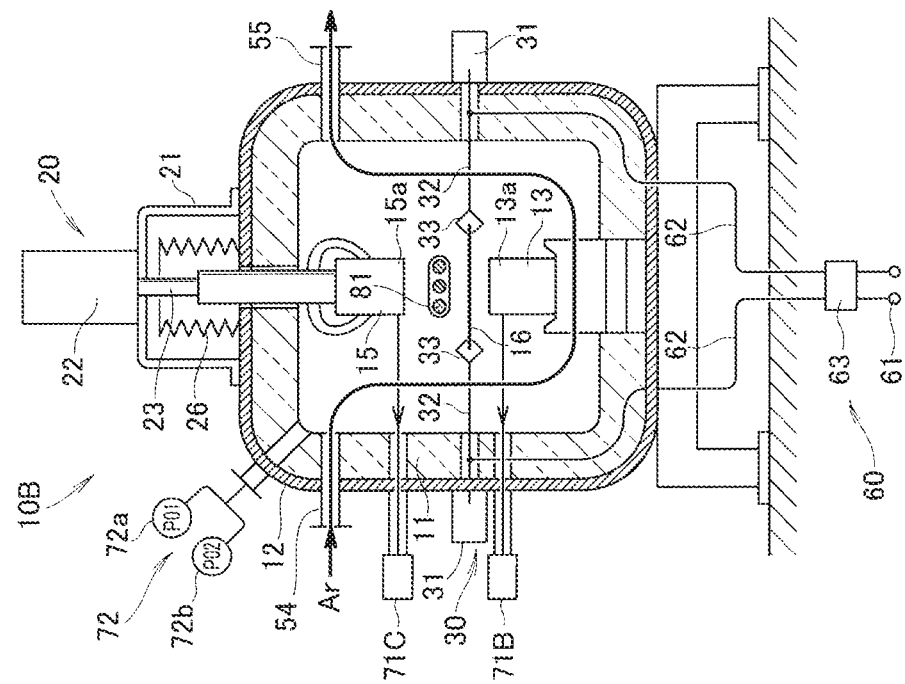

In a case where the inert gas is a gas lighter than air such as the nitrogen gas ($N_2$), in a steel member bonding apparatus 10C shown in FIG. 8B, the gas inlet 54 is arranged on an upper portion of the furnace shell 12, and the gas outlet 55 is arranged facing the gas inlet 54 on a lower portion of the furnace shell 12. The apparatus 10C does not have the exhaust mechanism 40 of FIG. 1. The components of FIG. 8B, equal to those of FIG. 1, are denoted by the same reference numerals, and detailed explanations thereof are omitted.

In this example, after ST03 of FIG. 4, the inside of the furnace shell 12 is under an ambient (air) atmosphere.

Then, the inert gas lighter than air is supplied through the gas inlet 54 shown in FIG. 8B to the furnace shell 12. The inert gas fills the furnace shell 12 from the upper portion and then to the lower portion, and as the inert gas fills the furnace shell 12, the air is discharged through the gas outlet 55. When the inside of the furnace shell 12 is replaced by the inert gas atmosphere, the heating is started.

Thus, in the case of using the steel member bonding apparatus 10C, ST04 of FIG. 4 is not needed, and ST06 is carried out after ST03. Since the exhaust mechanism 40 is not required, the steel member bonding apparatus 10C can have a simple structure and can be obtained at low cost.

What is claimed is:

1. A method for bonding a first steel member and a second steel member with a carbon sheet utilizing isothermal solidification, comprising:
    a heating process of, while keeping the carbon sheet out of contact with the first steel member and the second steel member, heating at least one of the first steel member and the second steel member using a heating mechanism in a vacuum atmosphere or an inert gas atmosphere, to heat a connection portion of the at least one of the first steel member and the second steel member to a temperature equal to or higher than an eutectic point and lower than a liquidus-line temperature in an Fe—C phase diagram, and
    a pressure bonding process of sandwiching the carbon sheet between the first steel member and the second steel member, and then pressing and bonding the connection portions of the first steel member and the second steel member using a pressing mechanism, to diffuse carbon from the carbon sheet into the connection portions;
    wherein the carbon sheet is an aggregate of carbon fiber pieces having a fine diameter.

2. The method according to claim 1, wherein
    in the heating process, the connection portions are arranged facing each other at a distance, and the carbon sheet is located between the connection portions but not in contact with the connection portions.

3. The method according to claim 1, wherein
    the heating mechanism is an induction heating coil or an electromagnetic wave generation mechanism, and
    the connection portion and its neighboring portion are heated by the induction heating coil or an electromagnetic wave generated from the electromagnetic wave generation mechanism.

4. The method according to claim 1, wherein
    the heating mechanism is an electric power source for energizing the carbon sheet, and
    the carbon sheet is energized and heated by the electric power source, and the connection portion and its neighboring portion is heated by heat from the carbon sheet.

5. The method according to claim 1, wherein
    the carbon sheet has an interspace inside, and a molten steel penetrates into the interspace.

6. An apparatus for bonding steel members, comprising:
    a furnace shell lined or filled with a heat insulator,
    a support member attached to the furnace shell, for supporting a first steel member,
    a pressing mechanism attached to the furnace shell, for holding a second steel member, moving the second steel member toward the first steel member, and pressing the second steel member onto the first steel member,
    a sheet holding mechanism for holding a carbon sheet between the first steel member and the second steel member, while keeping the carbon sheet out of contact with the first steel member and the second steel member, at least one of an exhaust mechanism attached to the furnace shell for vacuumizing an inside of the furnace shell and an inert gas supply mechanism for supplying an inert gas to the furnace shell, a heating mechanism attached to the furnace shell for heating a connection portion of at least one of the first steel member and the second steel member to a temperature equal to or higher than an eutectic point and lower than a liquidus-line temperature in an Fe—C phase diagram, a temperature sensor attached to the furnace shell for detecting a temperature of the connection portion of the at least one of the first steel member and the second steel member heated by the heating mechanism, a pressure sensor attached to the furnace shell for detecting an inner pressure of the furnace shell, and a control unit for controlling the pressing mechanism, controlling the heating mechanism based on temperature information detected by the temperature sensor, and controlling at least one of the exhaust mechanism and the inert gas supply mechanism based on pressure information detected by the pressure sensor.

7. The apparatus according to claim 6, wherein the heating mechanism contains at least one component selected from the group consisting of an induction heating coil for heating at least one of the connection portions of the first steel member and the second steel member, an electromagnetic wave generation mechanism for heating at least one of the connection portions of the first steel member and the second steel member, and an electric power source for energizing the carbon sheet.

\* \* \* \* \*